(12) United States Patent
Bickley

(10) Patent No.: US 9,267,477 B2
(45) Date of Patent: Feb. 23, 2016

(54) VARIABLE MINIMUM PRESSURE SYSTEM

(71) Applicant: Rolls-Royce Engine Control Systems Ltd., Derby (GB)

(72) Inventor: Daniel James Bickley, Solihull (GB)

(73) Assignee: ROLLS-ROYCE CONTROLS AND DATA SERVICES LIMITED, Derby (GB)

( * ) Notice: Subject to any disclaimer, the term of this patent is extended or adjusted under 35 U.S.C. 154(b) by 720 days.

(21) Appl. No.: 13/644,674

(22) Filed: Oct. 4, 2012

(65) Prior Publication Data

US 2013/0263826 A1    Oct. 10, 2013

(30) Foreign Application Priority Data

Oct. 5, 2011   (GB) .................................. 1117160.0

(51) Int. Cl.
| | |
|---|---|
| F02M 69/02 | (2006.01) |
| F02C 7/232 | (2006.01) |
| F02C 7/236 | (2006.01) |
| F02C 9/26 | (2006.01) |
| F02C 9/32 | (2006.01) |
| F02C 9/36 | (2006.01) |
| F02C 7/32 | (2006.01) |

(52) U.S. Cl.
CPC .............. *F02M 69/02* (2013.01); *F02C 7/232* (2013.01); *F02C 7/236* (2013.01); *F02C 7/32* (2013.01); *F02C 9/263* (2013.01); *F02C 9/32* (2013.01); *F02C 9/36* (2013.01); *F05D 2260/406* (2013.01)

(58) Field of Classification Search
CPC ..................... F02D 2200/0602; F02M 59/365; F02M 59/366; F02M 59/38; Y02T 10/44; F04B 49/22; F04B 49/24

USPC .......... 123/446, 447, 458, 495–499, 502, 506, 123/509, 511, 196 S, 198 D; 60/39.281, 734
See application file for complete search history.

(56) References Cited

U.S. PATENT DOCUMENTS

| | | | | |
|---|---|---|---|---|
| 4,245,694 | A | | 1/1981 | Smith |
| 5,622,152 | A | * | 4/1997 | Ishida ........................... 123/446 |
| 6,102,001 | A | * | 8/2000 | McLevige ..................... 123/387 |
| 6,176,076 | B1 | | 1/2001 | Ford |
| 6,381,946 | B1 | * | 5/2002 | Wernberg et al. .......... 60/39.281 |
| 6,422,203 | B1 | * | 7/2002 | Djordjevic .................... 123/456 |
| 6,446,437 | B1 | * | 9/2002 | Smith ............................. 60/734 |
| 6,494,182 | B1 | * | 12/2002 | Djordjevic .................... 123/456 |
| 6,619,027 | B1 | * | 9/2003 | Busch ........................ 60/39.281 |
| 6,688,277 | B1 | * | 2/2004 | Mahr et al. .................... 123/299 |
| 6,813,876 | B2 | * | 11/2004 | Griffiths et al. ............ 60/39.281 |
| 6,854,445 | B2 | * | 2/2005 | Okamoto ...................... 123/446 |

(Continued)

FOREIGN PATENT DOCUMENTS

| | | |
|---|---|---|
| EP | 1 557 546 | 7/2005 |
| WO | 2010/110936 A2 | 9/2010 |

*Primary Examiner* — John Kwon
*Assistant Examiner* — Johnny H Hoang
(74) *Attorney, Agent, or Firm* — Oliff PLC

(57) ABSTRACT

A fuel system comprises a fuel pump operable to deliver fuel through a supply line to a pressure raising valve, the pressure raising valve including a control chamber, the fuel pressure within the control chamber controlling a minimum pump pressure differential, and an actuator control servo-valve operable to control the supply of fuel from the supply line to an actuator control line, wherein the actuator control servo-valve further controls the pressure of fuel applied to the control chamber of the pressure raising valve.

7 Claims, 2 Drawing Sheets

(56) References Cited

U.S. PATENT DOCUMENTS

Figure 1:
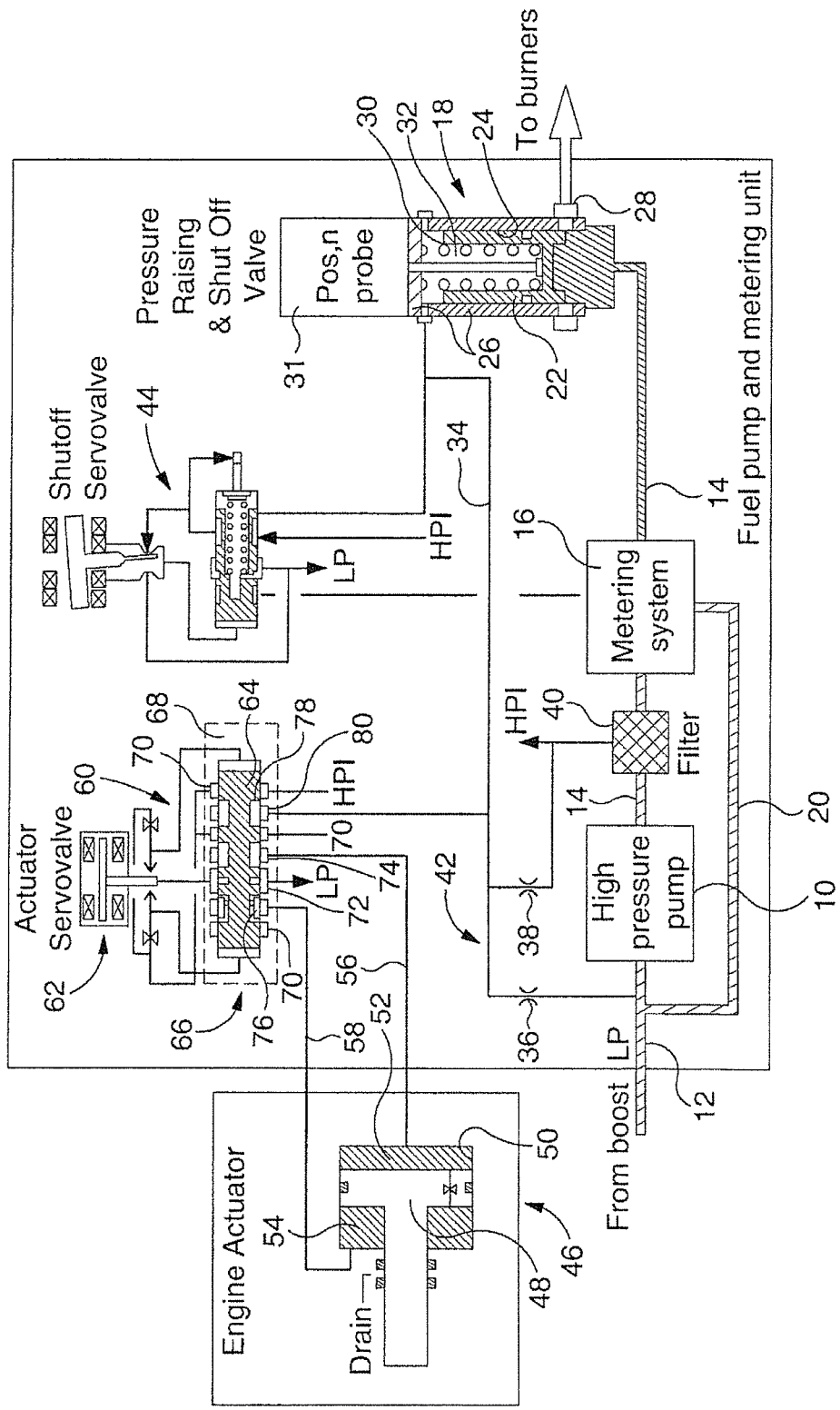

| | | | |
|---|---|---|---|
| 7,966,994 B2* | 6/2011 | Kleckler | 123/452 |
| 2001/0052338 A1* | 12/2001 | Yates | 123/506 |
| 2002/0117154 A1* | 8/2002 | Inoue et al. | 123/506 |
| 2006/0042598 A1* | 3/2006 | Magel et al. | 123/446 |
| 2007/0012293 A1* | 1/2007 | Mattes et al. | 123/447 |
| 2009/0094974 A1 | 4/2009 | Galozio et al. | |
| 2011/0023982 A1 | 2/2011 | Griffiths | |
| 2011/0146823 A1 | 6/2011 | Griffiths et al. | |

* cited by examiner

VARIABLE MINIMUM PRESSURE SYSTEM

This invention relates to a fuel system, and in particular to a fuel system suitable for use in controlling the supply of fuel to an aircraft engine.

It is usual for a fuel system for use in controlling the supply of fuel to an aircraft engine to include a high pressure fuel pump from which fuel is supplied via a metering valve or other fuel metering arrangement to the engine. The output of the high pressure fuel pump is also often used to drive a number of so-called fuel-draulic actuators associated with the engine. In order to ensure that such actuators operate correctly, it is important to ensure that the pressure differential generated by the fuel pump, sometimes referred to as the system pressure rise, exceeds a minimum level as this pump pressure differential provides the servo pressure differential which drives the actuators, in use. Typically, the fuel system incorporates a pressure raising valve set to ensure that the desired minimum pump pressure differential is achieved, only opening to allow fuel delivery to the associated engine when the minimum pressure differential has been attained. In order to avoid using actuators of large dimensions whilst ensuring correct operation of the actuators, it is desirable for the minimum pump pressure differential to be relatively high.

Whilst, in order to ensure correct operation of the actuators mentioned hereinbefore, it is important to ensure that the fuel pump and pressure raising valve generate at least a relatively high minimum pump pressure differential, it is also desirable for the pump pressure differential to be low at least during certain operating conditions, for example so as to permit reduced engine starting speeds and to reduce fuel heating during engine operating conditions such as during cruise and idle descent when a significant proportion of the fuel output from the high pressure pump is not delivered to the engine but rather is recirculated back to a low pressure input side of the pump. This excess, recirculated flow is often referred to as a spill or bypass flow.

These conflicting requirements are difficult to accommodate. Attempts to accommodate them have been made by incorporating a passive restrictor or using a push piston arrangement associated with the pressure raising valve of such a system. Examples of such arrangements are described in, for example, EP1557546, U.S. Pat. No. 6,176,076 and U.S. Pat. No. 4,245,964.

In order for the positions of the actuators to be adjusted, the servo pressure differential that must be applied thereto needs to be sufficient to overcome both frictional loadings, primarily friction within the associated unison ring, and aerodynamic loadings from the components being moved. The frictional loadings are not insignificant and can exceed the aerodynamically applied loadings. Conventionally, the minimum pressure differential is set at a level to ensure that these frictional and aerodynamically applied loadings can be countered, and thus ensure that the actuators can be operated as required. As mentioned hereinbefore, this relatively high minimum pressure differential can result in undesirable levels of heating of the fuel or other disadvantageous effects under certain engine operating conditions.

It has been noted that the actuators are not constantly driven for movement. During time periods in which the actuators are stationary, the minimum pump pressure differential could be reduced, for example relying upon frictional forces to hold the actuators against movement during these periods, the minimum pump pressure differential being elevated when movement of the actuators is required.

It is an object of the invention to provide a fuel system in which the disadvantages outlined hereinbefore are overcome or are of reduced effect.

According to the present invention there is provided a fuel system comprising a fuel pump operable to deliver fuel through a supply line to a pressure raising valve, the pressure raising valve including a control chamber, the fuel pressure within the control chamber determining a minimum pump pressure differential, and an actuator control servo-valve operable to control the supply of fuel from the supply line to an actuator control line, wherein the actuator control servo-valve further controls the pressure of fuel applied to the control chamber of the pressure raising valve.

In such an arrangement, when the actuator control servo-valve is operated to supply fuel to the actuator control line, it can also raise the pressure within the control chamber of the pressure raising valve, thereby raising the minimum pump pressure differential to a level sufficient to ensure that the actuator can operate correctly. When fuel is not supplied to the actuator control line, the control chamber pressure can be reduced resulting in or permitting a reduced pump pressure differential, and so in reduced engine starting speeds and reduced fuel heating at high recirculated flow engine operating conditions.

Conveniently, the control chamber communicates with a control line, a pressure potentiometer network holding the pressure in the control line at an intermediate level between the fuel pressures at the inlet and outlet of the fuel pump, the actuator control servo-valve including a port arrangement whereby the control line pressure can be raised above this intermediate level.

A shut-off servo-valve arrangement is conveniently provided and is operable, when engine shut-down is required, to raise the control chamber pressure so as to close the pressure raising valve. In such an arrangement it will be appreciated that the pressure raising valve serves as a pressure raising and shut-off valve.

A single actuator control line may be provided, the actuator control servo-valve controlling the fuel pressure therein by controlling the connection thereof to high and low pressure sources. Alternatively, a pair of actuator control lines may be provided, the actuator control servo-valve controlling which of these control lines is connected to high pressure and which is connected to low pressure at any given time.

Figure 2:
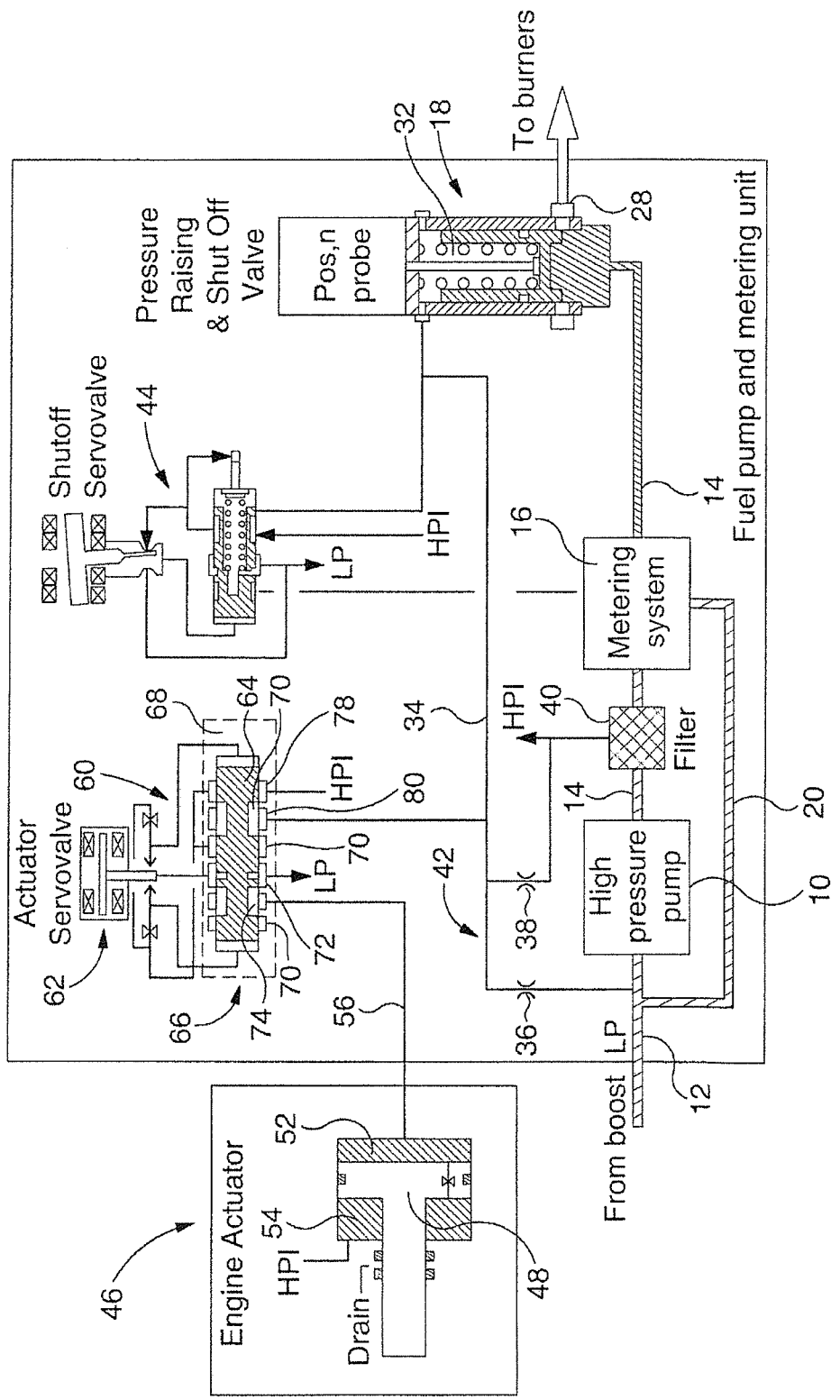

The invention will further be described, by way of example, with reference to the accompanying drawings, in which:

FIG. 1 is a diagram illustrating a fuel system in accordance with one embodiment of the invention; and FIG. 2 is a view similar to FIG. 1 illustrating an alternative embodiment.

Referring to FIG. 1, a fuel system for use in controlling the supply of fuel to an aircraft engine is illustrated. The fuel system comprises a high pressure fuel pump 10 operable to supply fuel from an inlet line 12 to a supply line 14, raising the fuel pressure to a high level. The precise form of the fuel pump 10 is not of relevance to the invention and it will be appreciated by a man skilled in the art that it may take a range of forms, for example comprising a gear pump or a variable displacement vane pump. A metering unit or system 16 is provided in the supply line 14, the metering system 16 being controlled in such a manner as to maintain the supply of fuel through the supply line 14 to a pressure raising valve 18 at a desired rate. Excess fuel delivered to the metering system 16 may be returned to the low pressure, inlet side of the fuel pump 10 by way of a spill line 20.

The pressure raising valve 18 comprises a valve member 22 slidable within a bore 24 formed in a housing 26. An outlet port 28 opens into the bore 24 and, depending upon the position of the valve member 22, may be closed by the valve member 22. A spring 30 biases the valve member 22 towards a position in which the valve member 22 closes the bore 24 and thus fuel delivery to the outlet port 28 from the supply line 14 is not permitted. A sensor 31 monitors the position of the valve member 22. When the fuel pressure within the supply line 14 is sufficiently high, the fuel pressure acting upon the end of the valve member 22 is able to lift the valve member 22 to a position in which the outlet port 28 is opened and thus fuel delivery through the outlet port 28 to an associated engine manifold can take place.

The spring 30 is located within a control chamber 32 defined between the valve member 22 and the housing 26, and a control line 34 communicates with the control chamber 32 to control the fuel pressure within the control chamber 32. It will be appreciated that the fuel pressure that must be present within the supply line 14 to open, and maintain open, the pressure raising valve 18, is dependent in part upon the fuel pressure within the control chamber 32.

The control line 34 communicates, via a low pressure restrictor 36, with the low pressure inlet line 12 and, via a high pressure restrictor 38, with the supply line 14 via a flow washed filter 40 provided therein. The low and high pressure restrictors 36, 38 together form a fuel pressure potentiometer 42 which serves to hold the control line 34 at an intermediate pressure between the pressures at the low and high pressure sides of the fuel pump 10.

A shut-off servo-valve arrangement 44 communicates with the control line 34 and is operable under the control of an engine control unit (not shown) to supply fuel at high pressure to the control line 34, raising the pressure therein above the said intermediate level, when it is desired to shut down the associated engine. The supply of fuel at high pressure to the control line 34 raises the fuel pressure therein, and that within the control chamber 32, thereby increasing the force urging the valve member 22 towards its closed position and resulting in closure of the pressure raising valve 18. It will be appreciated, therefore, that the pressure raising valve 18 is a pressure raising and shut off valve. Whilst, in this embodiment, the pressure raising valve also serves as a shut off valve, this need not always be the case and other techniques for terminating fuel delivery to the engine could be employed.

As mentioned hereinbefore, it is common for the output of the fuel pump 10 to be used to operate a number of actuators. In the arrangement shown in FIG. 1 a single actuator 46 is shown but it will be appreciated that more actuators may be provided if required. The actuator 46 comprises a piston 48 moveable within a bore 50 and defining therewith first and second chambers 52, 54. First and second actuator control lines 56, 58 communicate, respectively, with the first and second chambers 52, 54. An actuator control servo-valve arrangement 60 controls the communication between the actuator control lines 56, 58 and high and low pressure sources, thereby controlling movement of the actuator 46 and the operation of devices controlled thereby.

The actuator control servo-valve arrangement 60 is a two stage servo-valve arrangement comprising an electromagnetically controlled stage 62 controlling the pressures applied to opposite ends of a spool 64 of a second stage 66 of the arrangement 60 and so controlling the position of the spool 64. The second stage 66 includes a housing 68 defining a series of high pressure ports 70, supplied with fuel at high pressure via the filter 40, and a low pressure port 72 connected to the low pressure side of the pump 10. The spool 64 defines a pair of annular chambers 74, 76 positioned, and of dimensions such that, throughout the range of movement of the spool 64, the chambers 74, 76 register, respectively, with ports communicating with the first and second actuator control lines 56, 58. When the spool 64 occupies a neutral position, as shown, lands on the spool 64 prevent communication between the ports 70, 72 and the chambers 74, 76. Movement of the spool 64 away from this neutral position to the left in the orientation shown in FIG. 1 results in the low pressure port 72 communicating with the chamber 74, and one of the high pressure ports 70 communicating with the chamber 76. As a consequence, the first chamber 52 is vented to low pressure whilst the second chamber 54 is pressurised, and the actuator piston 48 is urged to the right. Return movement of the spool 64 to its neutral position will tend to lock the actuator 46 against movement, aided by frictional loadings within the actuator 46 and device operated thereby. Further movement of the spool 64 to the right of its neutral position connects the chamber 74 to a different one of the high pressure ports 70, and connects the chamber 76 to the low pressure port 72. As a consequence, the first chamber 52 is pressurised whilst the second chamber 54 is vented to low pressure, resulting in the actuator 46 being driven in the opposite direction.

The spool 64 further includes a chamber 78 in constant communication, throughout the range of movement of the spool 64, with a control port 80 connected to the control line 34. The port 80 is located between a pair of the high pressure ports 70, and the chamber 78 is positioned and of dimensions such that, when the spool 64 occupies its neutral position, the chamber 78 communicates just with the port 80. Movement of the spool 64 away from its neutral position, in either direction, results in the chamber 78 communicating with one or other of the adjacent high pressure ports 70, thus establishing a high pressure connection to the control line 34 and raising the pressure therein above the said intermediate pressure.

In use, when adjustment of the actuator 46 is not taking place and so the spool 64 occupies its neutral position, it will be appreciated that the fuel pressure within the control line 34 and control chamber 32 of the pressure raising valve 18 is set by the pressure potentiometer network 42. Provided the pump 10 is operating at a rate to provide sufficient pump pressure differential and maintain a fuel pressure within the line 14 sufficient to hold the valve member 22 in an open position against the action of the fuel pressure within the control chamber 32 and the action of the spring 30, then fuel delivery to the associated engine will take place. If the pump pressure differential and hence fuel pressure within the line 14 is reduced, then the pressure raising valve 18 may close. The pressure at which the pressure raising valve 18 is set to open during this mode of operation is conveniently relatively low, thereby reducing the disadvantages mentioned hereinbefore. During this mode of operation, the pump pressure differential and hence fuel pressure within the line 14 may be insufficient to drive the actuator 46 as required.

When it is desired to adjust the position of the actuator 46, the position of the spool 64 is adjusted by operation of the first stage 62 to apply high pressure to one of the chambers 52, 54 and low pressure to the other of the chambers 52, 54. The movement of the spool 64 will also result in the application of fuel under high pressure to the control line 34 and control chamber 32 as a result of the chamber 78 registering with one or other of the adjacent high pressure ports 70. The increased pressure within the control chamber 32 results in the minimum pump pressure differential rising, thereby ensuring that a sufficiently high pump pressure differential is generated to operate the actuator 46 as required. After the actuator 46 has been moved to its desired position, the spool 64 is returned to its neutral position, thereby breaking the high pressure connection to the control line 34 and control chamber 32, and so returning the pump pressure differential to a reduced level.

It will be appreciated that during the periods of time when the actuator 46 is being moved the minimum pump pressure differential is increased and so at least some of the disadvantageous effects associated with a relatively high minimum pump pressure differential may temporarily occur. However, the intermittent adjustment of the actuators that occurs in normal use means that the fuel system will operate predominantly in the mode in which the minimum pump pressure differential is reduced. In particular, at start and during cruise and idle descent, operating conditions during which an elevated pump pressure differential is particularly disadvantageous, operation of the fuel system at an increased level of pump pressure differential is avoided or reduced.

Sensors (not shown) associated with the actuators 46 can be used to provide an indication that the system is operating correctly. Should the actuator control servo-valve arrangement 60 have failed then the system will be unable to drive the actuator 46 to a desired position and this failure will be apparent from the output of the position sensor associated with that actuator. Provided the actuator 46 is responding as expected, then this can be used to indicate that the system is functioning correctly. The risk of a dormant undetected failure is therefore reduced.

FIG. 2 illustrates an alternative embodiment. For the most part, the arrangement of FIG. 2 is substantially the same as that of FIG. 1 and so only the significant differences therebetween will be described. In the arrangement of FIG. 2, the second chamber 54 of the actuator 46 is permanently connected to high pressure. The first chamber 52 communicates by way of control line 56 with a chamber 74 provided in the spool 64. As shown, movement of the spool 64 to the left brings the chamber 74 into communication with one of the high pressure ports 70, increasing the fuel pressure within the first chamber 52 to substantially the same pressure as that within the second chamber 54. The difference in effective areas of the piston 48 exposed to the pressures within the chambers 52, 54 will result in the actuator piston 48 moving to the left in such circumstances. Movement of the spool 64 to its neutral position will tend to lock the piston 48 against movement. Movement of the spool 64 to the right from its neutral position establishes a low pressure connection to the chamber 52, reducing the pressure therein below that within the chamber 54 and resulting in the actuator piston 48 moving to the right. In both directions of movement, as with the embodiment of FIG. 1, the movement of the spool 64 results in a high pressure connection to the control line 34 being established which, in turn, increases the pressure within the control chamber 32 of the pressure raising valve 18 and so results in a temporary increase in the minimum pump pressure differential whilst the actuator 46 is being adjusted.

It will be appreciated that the arrangements described hereinbefore in accordance with the invention are advantageous in that the minimum pump pressure differential can be varied between a relatively low level when actuator adjustment is not required, thereby benefiting from the advantages associated with a relatively low minimum pump pressure differential, and a relatively high level when actuator adjustment is taking place, thereby ensuring that actuator adjustment can take place as desired, without requiring significant modification to the design of such actuators. Whilst specific embodiments of the invention have been described hereinbefore, it will be appreciated that a wide range of modifications and alterations may be made thereto without departing from the scope of the invention.

The invention claimed is:

1. A fuel system comprising:
    a fuel pump configured to deliver fuel through a supply line to a pressure raising valve, the pressure raising valve including a control chamber, fuel pressure within the control chamber controlling a minimum pump pressure differential, and
    an actuator control servo-valve configured to control a supply of fuel from the supply line to an actuator control line, wherein the actuator control servo-valve further controls the pressure of fuel applied to the control chamber of the pressure raising valve;
    wherein the control chamber communicates with a control line, and a pressure potentiometer network which includes low and high pressure restrictors configured to hold the pressure in the control line at an intermediate level between a low fuel pressure at the inlet of the fuel pump and a high fuel pressure at the outlet of the fuel pump;
    wherein the actuator control servo-valve includes a port arrangement whereby the control line pressure can be raised above said intermediate level; and
    wherein the actuator control servo-valve is configured to interchangeably apply said high pressure and said low pressure to the actuator control line, and further is configured to raise the pressure in the control line above said intermediate level when said high pressure is applied to the actuator control line, and also to raise the pressure in the control line above said intermediate level when said low pressure is applied to the actuator control line.

2. A system according to claim 1, further comprising a shut-off servo-valve arrangement operable, when engine shut-down is required, to raise the control chamber pressure so as to close the pressure raising valve.

3. A system according to claim 1, wherein a single actuator control line is provided, the actuator control servo-valve controlling the fuel pressure therein by controlling the connection thereof to high and low pressure sources.

4. A system according to claim 1, wherein a pair of actuator control lines provided, the actuator control servo-valve controlling which of these control lines is connected to high pressure and which is connected to low pressure at any given time.

5. A system according to claim 1, further comprising an actuator including a chamber in communication with the actuator control line.

6. A system according to claim 1, wherein the actuator control servo-valve comprises a two stage servo-valve.

7. A system according to claim 6, wherein the two-stage servo-valve comprises an electromagnetically controlled first stage operable to control the position of a spool of a second stage thereof.

* * * * *